(12) United States Patent
Chen et al.

(10) Patent No.: US 11,762,495 B2
(45) Date of Patent: Sep. 19, 2023

(54) ELECTRONIC DEVICE (71) Applicant: ASUSTeK COMPUTER INC., Taipei (TW)

(72) Inventors: Ming-Chieh Chen, Taipei (TW); Chun-Tsai Yeh, Taipei (TW); Yu-Ning Kuo, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/699,275

(22) Filed: Mar. 21, 2022

(65) Prior Publication Data

US 2022/0317800 A1 Oct. 6, 2022

(30) Foreign Application Priority Data

Apr. 1, 2021 (CN) .......................... 202110355069.6

(51) Int. Cl.
*G06F 3/041* (2006.01)
*G06F 3/0354* (2013.01)
*G06F 3/038* (2013.01)

(52) U.S. Cl.
CPC ............ *G06F 3/0416* (2013.01); *G06F 3/038* (2013.01); *G06F 3/03545* (2013.01); *G06F 3/03547* (2013.01)

(58) Field of Classification Search
None
See application file for complete search history.

(56) References Cited

U.S. PATENT DOCUMENTS

| 2011/0047459 A1* | 2/2011 | Van Der Westhuizen .................. G06F 3/04883 345/173 |
| 2014/0143676 A1* | 5/2014 | Tan .......................... G06F 9/451 715/744 |
| 2016/0103496 A1* | 4/2016 | Degner .................. G06F 1/169 345/157 |
| 2016/0180762 A1* | 6/2016 | Bathiche ................. G06F 3/038 345/174 |
| 2019/0250666 A1* | 8/2019 | Klein .................... G06F 3/0393 |

FOREIGN PATENT DOCUMENTS

| CN | 101498983 B | 11/2011 |
| CN | 102253744 B | 7/2014 |

* cited by examiner

*Primary Examiner* — Stephen T. Reed
(74) *Attorney, Agent, or Firm* — McClure, Qualey & Rodack, LLP (57) ABSTRACT

This application provides an electronic device, including: a processor, configured to select one of an absolute coordinate mode and a relative coordinate mode according to a switching instruction. When the processor uses the absolute coordinate mode, absolute coordinate information received by the processor is run in the absolute coordinate mode; and when the processor uses the relative coordinate mode, the absolute coordinate information received by the processor is converted into relative coordinate information and is run in the relative coordinate mode. Therefore, this application performs adaptive conversion between the absolute coordinate mode and the relative coordinate mode, to provide users with more flexible operations.

10 Claims, 8 Drawing Sheets

ELECTRONIC DEVICE

CROSS-REFERENCE TO RELATED APPLICATION

This application claims the priority benefit of Chinese application serial No. 202110355069.6, filed on Apr. 1, 2021. The entirety of the above-mentioned patent application is hereby incorporated by reference herein and made a part of the specification.

BACKGROUND OF THE INVENTION

Field of the Invention

This application relates to an electronic device which converts between an absolute coordinate mode and a relative coordinate mode.

Description of the Related Art

When a stylus is operated on a commercially available touchpad that supports a stylus, a trajectory marked by an operation indicator displayed on a display screen adopts an absolute coordinate mode of isometric mapping between the touchpad and the display screen. Although this absolute coordinate mode is a common way for a user to use a stylus to operate a touchpad, during actual use, this single mode also has limitations. The flexibility and selectivity of using a stylus on a touchpad are lacking, and operating habits or writing purposes of different users cannot be adopted.

BRIEF SUMMARY OF THE INVENTION

According to an aspect, an electronic device includes: a processor configured to select one of an absolute coordinate mode and a relative coordinate mode according to a switching instruction. When the processor uses the absolute coordinate mode, absolute coordinate information received by the processor is run in the absolute coordinate mode; and when the processor uses the relative coordinate mode, the absolute coordinate information received by the processor is converted into relative coordinate information and is run in the relative coordinate mode.

In summary, this application selects to maintain an original absolute coordinate mode or selects to convert the absolute coordinate mode into a relative coordinate mode according to a requirement of a user, so that more convenient and flexible operations are provided, and enough flexibility and selectivity are provided when the user uses a stylus on a touchpad, thereby adopting operating habits or writing purposes of different users.

For other functions of this application and detailed content of embodiments, descriptions are provided below with reference to the accompanying drawings.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art still derives other drawings from these accompanying drawings without creative efforts.

DETAILED DESCRIPTION OF THE EMBODIMENTS

The position relationships in the following embodiments of this specification include: "up", "down", "left", and "right". Unless otherwise specified, all the position relationships are based on directions shown by the components in the drawings.

Figure 1:
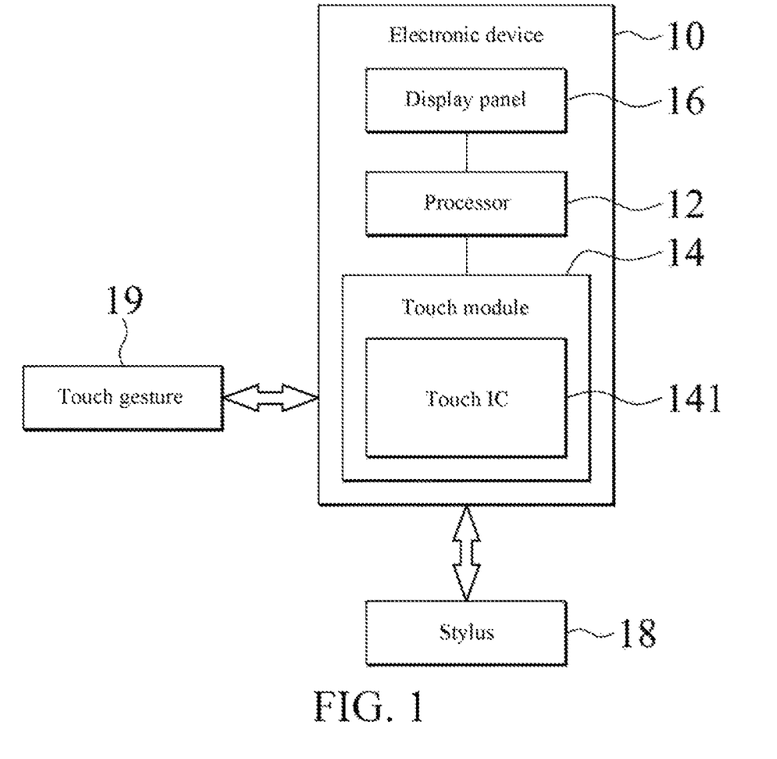
FIG. 1 is a schematic block diagram of an electronic device according to an embodiment of this application.

Referring to FIG. 1, an electronic device 10 includes a processor 12, a touch module 14, and a display panel 16. The processor 12 is electrically connected to the touch module 14 and the display panel 16, and the touch module 14 cooperates with a stylus 18, so that the stylus 18 is operated on the touch module 14. The touch module 14 further includes a touch integrated circuit (IC) 141 used for sensing an operation of the stylus 18 or receiving an operation of a touch gesture 19. Before the stylus 18 is operated on the touch module 14, the processor 12 selects one of an absolute coordinate mode and a relative coordinate mode as a current operation mode according to a switching instruction. When the stylus 18 is operated on the touch module 14, the touch module 14 correspondingly generates a group of absolute coordinate information. When the processor 12 selects the absolute coordinate mode according to the switching instruction, the absolute coordinate information received by the processor 12 from the touch module 14 directly runs in the absolute coordinate mode; and when the processor 12 selects the relative coordinate mode according to the switching instruction, the absolute coordinate information received by the processor 12 from the touch module 14 is first converted into relative coordinate information and is run in the relative coordinate mode.

In an embodiment, the electronic device 10 in FIG. 1 is a notebook computer, and the touch module 14 is a touchpad or any input module supporting a handwriting input. This application is not limited thereto.

Figure 2:
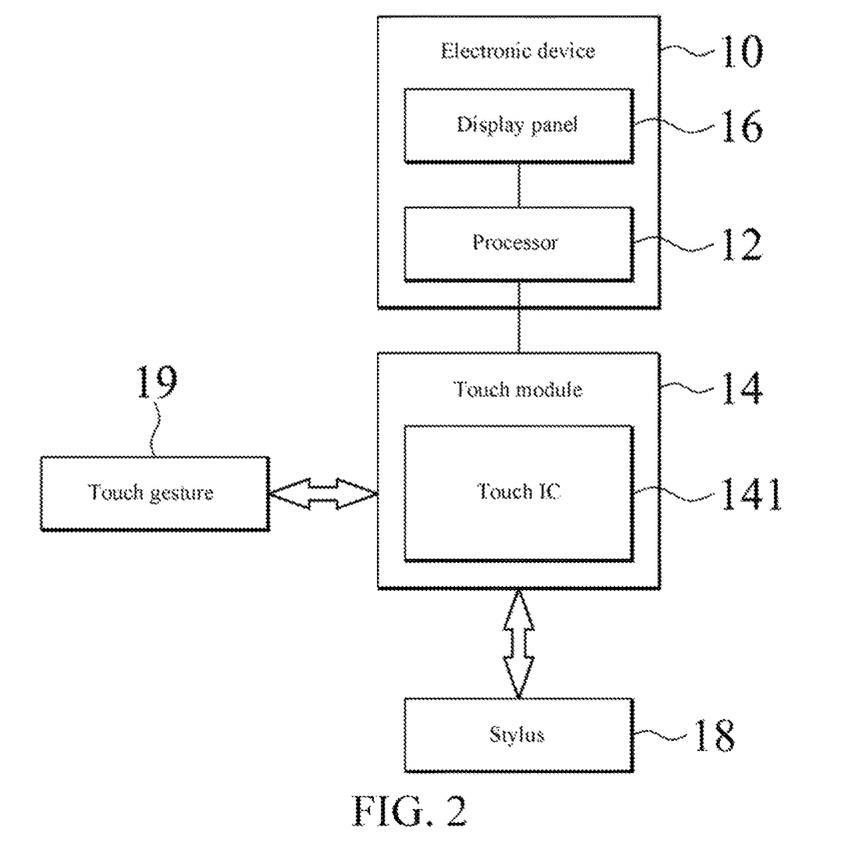
FIG. 2 is a schematic block diagram of an electronic device according to another embodiment of this application.

In another embodiment, referring to FIG. 2, an electronic device 10 includes a processor 12 and a display panel 16, and the processor 12 is electrically connected to the display panel 16. The processor 12 is further signal-connected to an external touch module 14 in a wired or wireless manner, and the touch module 14 cooperates with a stylus 18, so that the stylus 18 is operated on the touch module 14. The touch module 14 also includes a touch IC 141 for sensing an operation of the stylus 18 or a finger. Similar to the embodiment shown in FIG. 1, the processor 12 selects one of an absolute coordinate mode and a relative coordinate mode as a current operation mode according to a switching instruction. When the processor 12 uses the absolute coordinate mode, absolute coordinate information received by the processor 12 from the touch module 14 directly runs in the absolute coordinate mode; and when the processor 12 uses the relative coordinate mode, the absolute coordinate information received by the processor 12 from the touch module 14 is first converted into relative coordinate information and is run in the relative coordinate mode.

In an embodiment, the electronic device 10 in FIG. 2 is a tablet computer or a personal computer, and the touch module 14 is an external touchpad or any external input module supporting a handwriting input. This application is not limited thereto.

As shown in FIG. 1 or FIG. 2, in an embodiment, when the processor 12 sets the absolute coordinate mode as a default coordinate mode, the processor 12 directly converts the absolute coordinate mode into the relative coordinate mode when receiving the switching instruction. When the processor 12 does not receive any switching instruction, the processor 12 maintains the default absolute coordinate mode.

Referring to FIG. 1 and FIG. 2 together, for both the touch module 14 built into the electronic device 10 or the touch module 14 externally connected to the electronic device 10, an operating system (OS) in the processor 12 cooperates with stylus firmware and touchpad firmware in the touch IC 141 of the touch module 14 to jointly complete a function of enabling the stylus 18 on the touch module 14. Therefore, this application describes the function of completely enabling the stylus 18 from the perspective of a system architecture of the processor 12.

Figure 3:
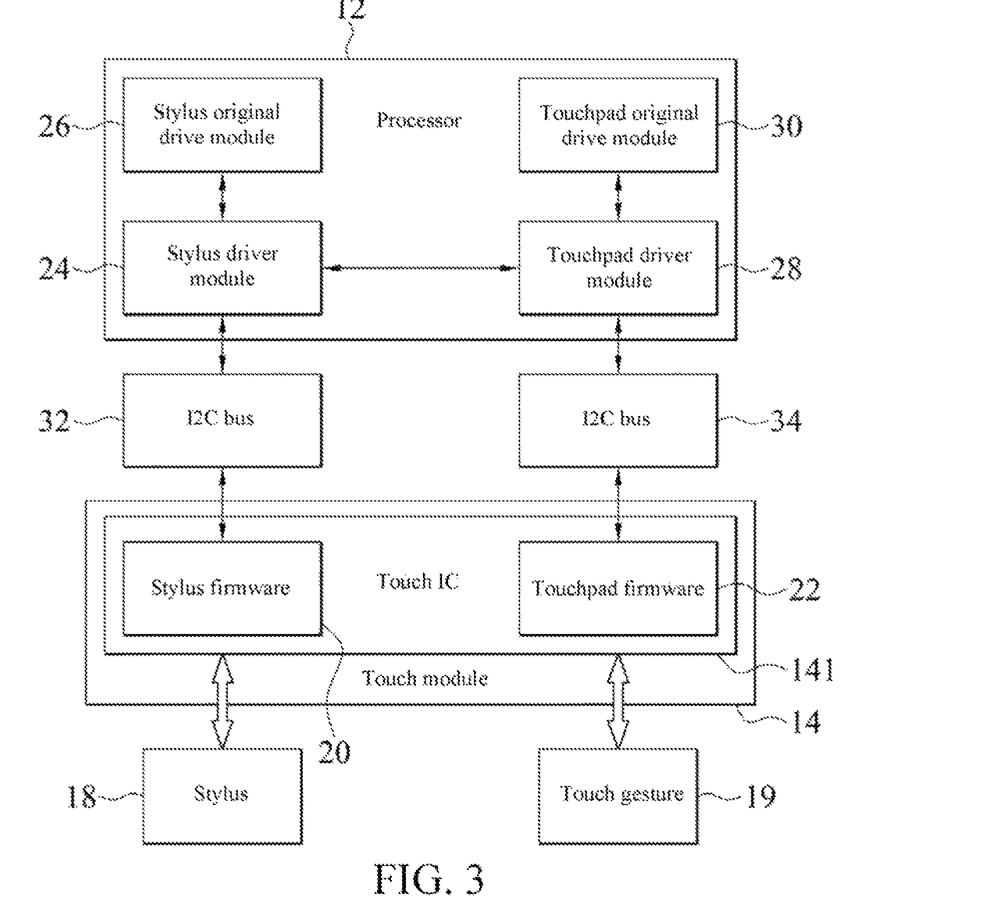
FIG. 3 is a schematic diagram of a system architecture of an electronic device according to an embodiment of this application.

Referring to FIG. 1 to FIG. 3 together, stylus firmware 20 and touchpad firmware 22 are mounted in the touch IC 141 to respectively correspond to the stylus 18 and the touch module 14. The system architecture of the processor 12 includes a stylus driver module 24, a stylus original drive module 26, a touchpad driver module 28, and a touchpad original drive module 30. The stylus driver module 24 is signal-connected to the stylus original drive module 26, and is signal-connected to the stylus firmware 20 in the touch IC 141 by an inter-integrated circuit (I2C) bus 32, so that the absolute coordinate information (a stylus signal) sensed by the stylus firmware 20 is transmitted to the stylus original drive module 26 via the I2C bus 32 and the stylus driver module 24, to execute a corresponding stylus function. The touchpad driver module 28 is signal-connected to the touchpad original drive module 30, and is signal-connected to the touchpad firmware 22 in the touch IC 141 by an I2C bus 34, so that relative coordinate information (a touchpad signal) sensed by the touchpad firmware 22 is transmitted to the touchpad original drive module 30 via the I2C bus 34 and the touchpad driver module 28 to execute a corresponding touchpad function. The stylus driver module 24 is signal-connected to the touchpad driver module 28, and the stylus driver module 24 selects one of the absolute coordinate mode and the relative coordinate mode according to a switching instruction generated by the touchpad driver module 28. Therefore, when the stylus 18 is used on the touch module 14, the corresponding function is executed according to the selected coordinate mode.

Figure 4:
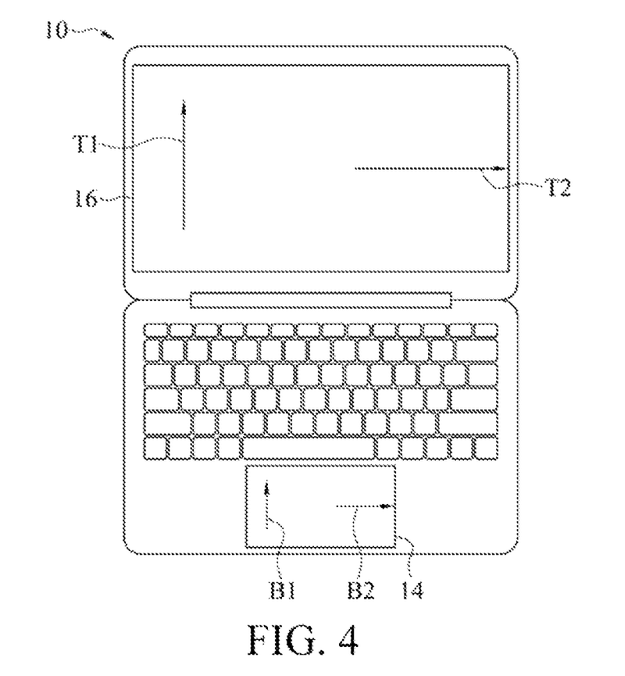
FIG. 4 is a schematic diagram of a status in which an electronic device runs in an absolute coordinate mode according to an embodiment of this application.
Figure 5:
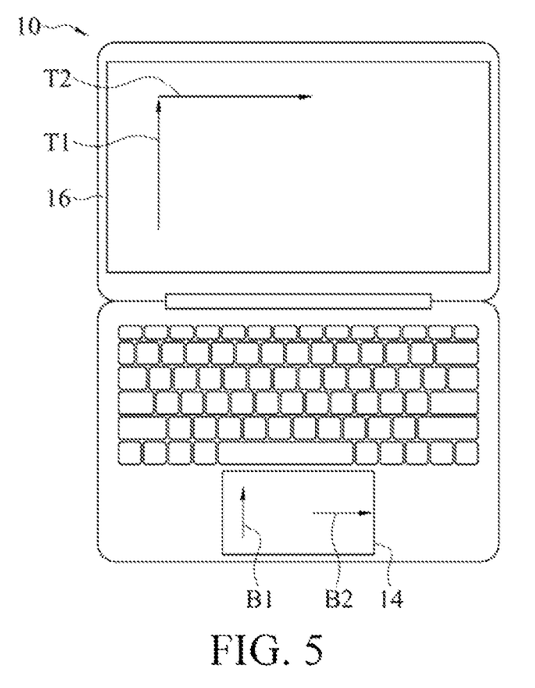
FIG. 5 is a schematic diagram of a status in which an electronic device runs in a relative coordinate mode according to an embodiment of this application.

Specifically, when the stylus driver module 24 selects the absolute coordinate mode, the stylus original drive module 26 executes a corresponding function according to the absolute coordinate information. As shown in FIG. 4, a trajectory marked by an operation indicator displayed on the display panel 16 adopts the absolute coordinate mode of isometric mapping between the touch module 14 and the display panel 16. When the stylus 18 is used for executing two operation behaviors B1 and B2 on the touch module 14, trajectories T1 and T2 displayed on the display panel 16 are related to the positions of two consecutive strokes of the stylus 18 on the touch module 14. When the stylus driver module 24 selects the relative coordinate mode, the stylus driver module 24 transmits a coordinate value of the absolute coordinate information to the touchpad driver module 28, and the touchpad driver module 28 converts the coordinate value into relative coordinate information and transmits the relative coordinate information to the touchpad original drive module 30, so that the touchpad original drive module 30 executes a corresponding function according to the relative coordinate information. As shown in FIG. 5, a trajectory marked by an operation indicator displayed on the display panel 16 adopts the relative coordinate mode. When the stylus 18 is used for executing two operation behaviors B1 and B2 on the touch module 14, trajectories T1 and T2 displayed on the display panel 16 are not related to the positions of two consecutive strokes of the stylus 18 on the touch module 14, and the trajectory T2 generated by the second operation behavior B2 continues from the trajectory T1 generated by the first operation behavior B1. In this relative coordinate mode, an operation scenario of using the stylus 18 is the same as an operation scenario in which a user uses a finger on the touch module 14. Therefore, the intuition and convenience of operation of the user are greatly improved.

Referring to FIG. 1 to FIG. 3 together, the switching instruction generated by the touchpad driver module 28 is determined by the touch gesture 19. When the user executes the touch gesture 19 on the touch module 14, the touchpad firmware 22 senses the touch gesture 19 to accordingly generate touch information, and transmits the touch information to the touchpad driver module 28 via the I2C bus 34, so that the touchpad driver module 28 determines whether the absolute coordinate mode or the relative coordinate mode is selected according to the touch information, and transmits the corresponding switching instruction generated accordingly to the stylus driver module 24. In an embodiment, when the processor 12 sets the absolute coordinate mode as the default coordinate mode, the touch gesture 19 is a specific single gesture. When the touchpad firmware 22 senses that touch information generated by the touch gesture 19 is transmitted to the touchpad driver module 28 via the I2C bus 34, the touchpad driver module 28 determines that it is information of converting a coordinate mode according to the touch information and transmits the corresponding switching instruction generated according to the touch information to the stylus driver module 24, so that the stylus driver module 24 converts the default absolute coordinate mode into the relative coordinate mode. In another embodiment, the touch gesture 19 further includes a first touch gesture and a second touch gesture, the first touch gesture indicates selecting the absolute coordinate mode, and the second touch gesture indicates selecting the relative coordinate mode. When the touchpad firmware 22 senses that first touch information generated by the first touch gesture is transmitted to the touchpad driver module 28 via the I2C bus 34, the touchpad driver module 28 determines that the user selects the absolute coordinate mode according to the first touch information and transmits the corresponding switching instruction generated accordingly to the stylus driver module 24, so that the stylus driver module 24 selects the absolute coordinate mode according to the switching instruction. When the touchpad firmware 22 senses that second touch information generated by the second touch gesture is transmitted to the touchpad driver module 28 via the I2C bus 34, the touchpad driver module 28 determines that the user selects the relative coordinate mode according to the second touch information and transmits the corresponding switching instruction generated accordingly to the stylus driver module 24, so that the stylus driver module 24 selects the relative coordinate mode according to the switching instruction. Therefore, this application selects the corresponding absolute coordinate mode or relative coordinate mode according to a different touch gesture 19.

In addition to using the touch gestures 19 to select the absolute coordinate mode or the relative coordinate mode in this application, this application also provides selection or switching for the user by executing an application program. Referring to FIG. 1, FIG. 2, FIG. 6, and FIG. 7 together, in an embodiment, in addition to the stylus driver module 24, the stylus original drive module 26, the touchpad driver module 28, and the touchpad original drive module 30, the system architecture of the processor 12 further includes an application program module 36. The application program module 36 is signal-connected to the stylus driver module 24, and the application program module 36 provides a user interface 38 to be displayed on the display panel 16 when an application program is started and executed. The user interface 38 includes at least two options: an absolute coordinate mode option 381 and a relative coordinate mode option 382. The user clicks the absolute coordinate mode option 381 or the relative coordinate mode option 382 through the user interface 38 to select the absolute coordinate mode or the relative coordinate mode. When the user clicks one of the absolute coordinate mode option 381 or the relative coordinate mode option 382, the user interface 38 correspondingly generates selection information and transmits the selection information to the application program module 36, and the application program module 36 receives the selection information, and generates a switching instruction according to the selection information and transmits the switching instruction to the stylus driver module 24. The stylus driver module 24 selects the corresponding absolute coordinate mode or relative coordinate mode according to the switching instruction. the stylus driver module 24, stylus original drive module 26, touchpad driver module 28, and touchpad original drive module 30 have the same connection relationship and actuation relationship as the embodiment shown in FIG. 3. For the content of this part, reference may be made to the foregoing description, and details are not described herein again.

Figure 6:
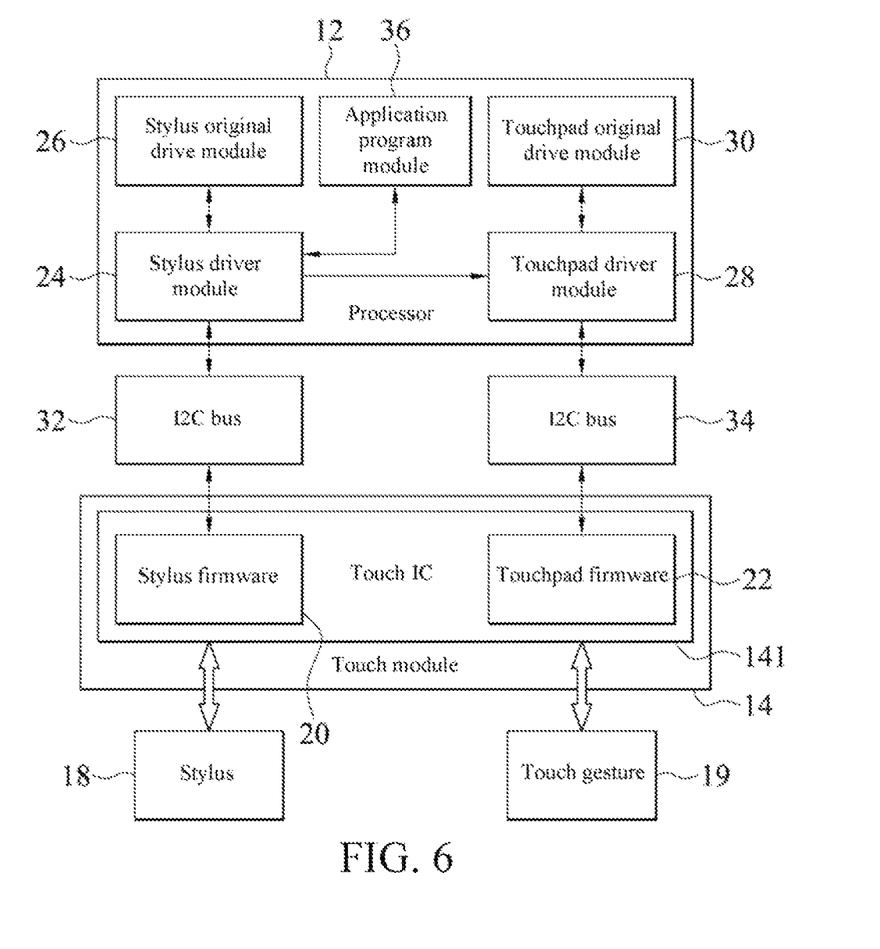
FIG. 6 is a schematic diagram of a system architecture of an electronic device according to another embodiment of this application.
Figure 7:
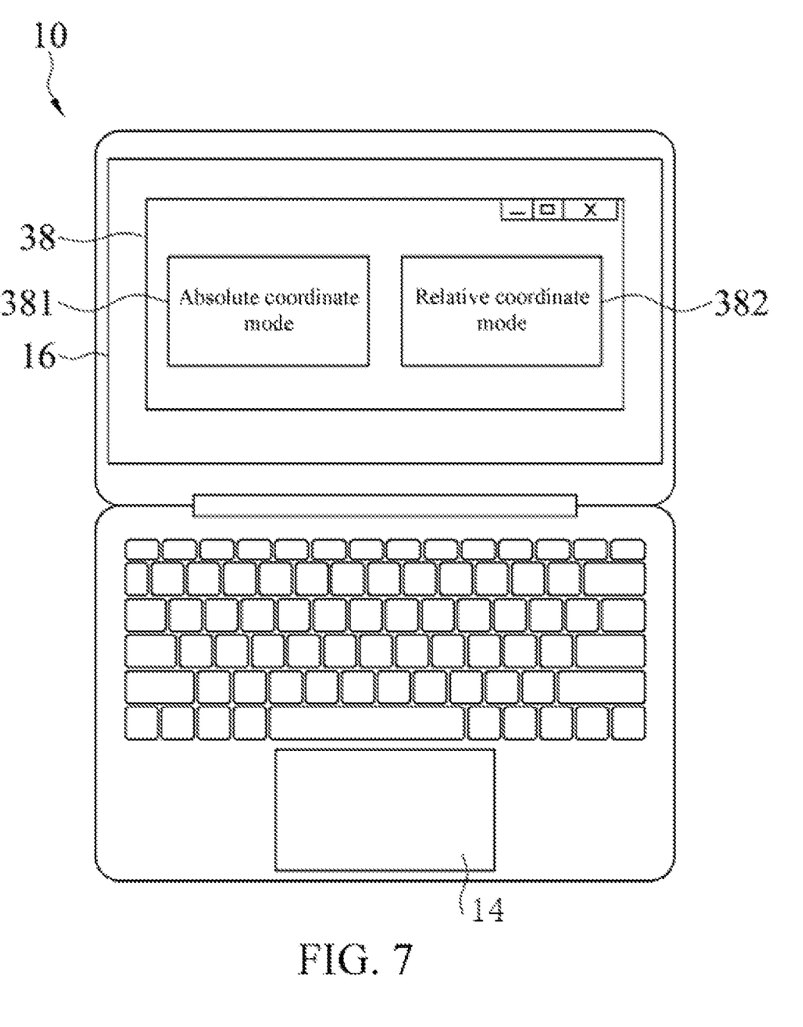
FIG. 7 is a schematic diagram of an electronic device of displaying a user interface according to an embodiment of this application.
Figure 8:
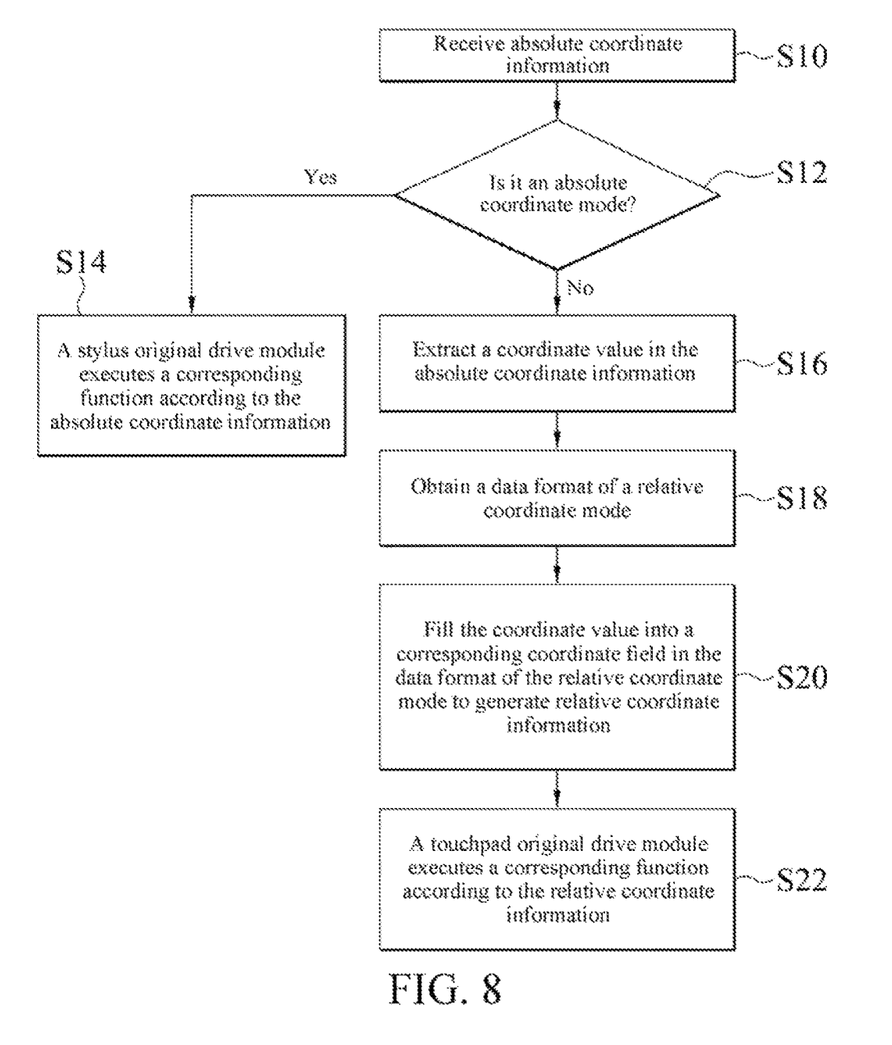
FIG. 8 is a schematic flowchart of enabling a stylus on an electronic device according to an embodiment of this application.

In an embodiment, the stylus driver module 24 also returns the default or set current coordinate mode to the application program module 36, so that the application program module 36 knows the currently used coordinate mode, and the currently used coordinate mode is also displayed on the user interface 38 to inform the user.

Referring to FIG. 1 to FIG. 3, FIG. 6, and FIG. 8 together, when the stylus 18 is used for operation on the touch module 14, the absolute coordinate information (a stylus signal) sensed by the stylus firmware 20 is transmitted to the stylus driver module 24 via the I2C bus 32. As shown in step S10, the stylus driver module 24 receives the absolute coordinate information. As shown in step S12, the stylus driver module 24 first determines whether a current coordinate mode is an absolute coordinate mode. When the absolute coordinate mode is used, as shown in step S14, the stylus driver module 24 directly transmits the absolute coordinate information to the stylus original drive module 26, and the stylus original drive module 26 executes a corresponding function according to the absolute coordinate information. When a relative coordinate mode is used, as shown in step S16, the stylus driver module 24 extracts a coordinate value (position information) in the absolute coordinate information, and transmits the coordinate value to the touchpad driver module 28. As shown in steps S18 and S20, the touchpad driver module 28 obtains a data format of the relative coordinate mode, and fills the coordinate value received by the stylus driver module 24 into a corresponding coordinate field in the data format of the relative coordinate mode to generate the relative coordinate information. The touchpad driver module 28 transmits the relative coordinate information to the touchpad original drive module 30. Finally, as shown in step S22, the touchpad original drive module 30 executes a corresponding function according to the relative coordinate information. In this way, when the user uses the stylus 18, this application performs adaptive conversion between the absolute coordinate mode and the relative coordinate mode for selecting the absolute coordinate mode or the relative coordinate mode according to personal preferences or habits for the stylus 18 to run in.

In an embodiment, referring to FIG. 3 or FIG. 6, in the processor 12, a query signal is sent when the OS is turned on, and the query signal is transmitted to the touchpad firmware 22 via the touchpad original drive module 30, the touchpad driver module 28, and the I2C bus 34. The purpose is to make the touchpad firmware 22 return the meanings of fields in the data format returned by the touchpad firmware 22 when a finger touches the touch module 14. The touchpad firmware 22 returns the data format to the OS via the I2C bus 34, the touchpad driver module 28, and the touchpad original drive module 30, and the OS parses returned data according to the meanings of the fields in the data format. Therefore, the touchpad driver module 28 knows the data format of the relative coordinate mode to be returned by the touchpad firmware 22 to the OS, to continue with the subsequent steps through the obtained data format of the relative coordinate mode.

In summary, when a stylus is used for operation, this application selects to maintain an original absolute coordinate mode or selects to convert the absolute coordinate mode into a relative coordinate mode according to a requirement of a user, so that more convenient and flexible operations are provided, and enough flexibility and selectivity are provided when the user uses the stylus on a touchpad, thereby adopting operating habits or writing purposes of different users.

The foregoing embodiments and/or implementations are merely preferred embodiments and/or implementations used for describing the technologies in this application, and are not intended to limit implementation forms of the technologies in this application. A person skilled in the art can make alterations or modifications to obtain other equivalent embodiments without departing from the scope of the technical solutions disclosed in the content of this application. Such equivalent embodiments shall still be regarded as technologies or embodiments substantially the same as this application.

What is claimed is:

1. An electronic device, comprising:
   a processor, configured to select one of an absolute coordinate mode and a relative coordinate mode according to a switching instruction, wherein when the processor uses the absolute coordinate mode, absolute coordinate information received by the processor is run in the absolute coordinate mode; and when the processor uses the relative coordinate mode, the absolute coordinate information received by the processor is converted into relative coordinate information and is run in the relative coordinate mode;

a touch module, signal-connected to the processor, and receiving an operation on the touch module to generate the absolute coordinate information and transmit the absolute coordinate information to the processor; and a stylus, cooperated with the touch module, and the stylus is operated on the touch module, so the touch module correspondingly generates the absolute coordinate information, wherein when the stylus is used for executing operation behaviors on the touch module in the relative coordinate mode, trajectories displayed on a display panel of the electronic device are not related to the positions of consecutive operation behaviors of the stylus on the touch module and a trajectory generated by an operation behavior continues from a preceding trajectory generated by a preceding operation behavior.

2. The electronic device according to claim 1, wherein when the absolute coordinate mode is a default coordinate mode, the processor converts the absolute coordinate mode into the relative coordinate mode when receiving the switching instruction.

3. The electronic device according to claim 1, wherein the processor further comprises a stylus driver module, a stylus original drive module, a touchpad driver module, and a touchpad original drive module, the stylus driver module is signal-connected to the stylus original drive module and the touchpad driver module, the touchpad driver module is signal-connected to the touchpad original drive module, and the stylus driver module selects one of the absolute coordinate mode and the relative coordinate mode according to the switching instruction; when the stylus driver module selects the absolute coordinate mode, the stylus original drive module executes a corresponding function according to the absolute coordinate information; and when the stylus driver module selects the relative coordinate mode, the stylus driver module transmits a coordinate value of the absolute coordinate information to the touchpad driver module, and the touchpad driver module converts the coordinate value into relative coordinate information and transmits the relative coordinate information to the touchpad original drive module, so that the touchpad original drive module executes a corresponding function according to the relative coordinate information.

4. The electronic device according to claim 3, wherein the touch module further comprises a touch integrated circuit (IC), the touch IC comprises stylus firmware and touchpad firmware, the stylus firmware is signal-connected to the stylus driver module by a bus, and the touchpad firmware is signal-connected to the touchpad driver module by the bus, so that the stylus firmware senses an operation of the stylus to correspondingly generate the absolute coordinate information.

5. The electronic device according to claim 4, wherein the touchpad firmware further senses a touch gesture to correspondingly generate touch information, and transmits the touch information to the touchpad driver module via the bus, so that the touchpad driver module determines, whether the absolute coordinate mode or the relative coordinate mode is selected according to the touch information, and transmits the switching instruction generated accordingly to the stylus driver module.

6. The electronic device according to claim 5, wherein the touch gesture further comprises a first touch gesture and a second touch gesture, the first touch gesture indicates selecting the absolute coordinate mode, and the second touch gesture indicates selecting the relative coordinate mode, so that the touchpad firmware generates the corresponding touch information according to the first touch gesture or the second touch gesture.

7. The electronic device according to claim 4, wherein the processor further comprises an application program module signal-connected to the stylus driver module, wherein the application program module receives selection information, and generates the switching instruction according to the selection information and transmits the switching instruction to the stylus driver module.

8. The electronic device according to claim 7, further comprising a display panel, electrically connected to the processor, wherein the application program module provides a user interface to be displayed on the display panel for selecting the absolute coordinate mode or the relative coordinate mode through the user interface, and correspondingly generating the selection information.

9. The electronic device according to claim 3, wherein the step that the touchpad driver module converts the coordinate value into the relative coordinate information further comprises:

obtaining a data format of the relative coordinate mode; and filling the coordinate value into a corresponding coordinate field in the data format of the relative coordinate mode to generate the relative coordinate information.

10. The electronic device according to claim 4, wherein the bus is an inter-integrated circuit (I2C) bus.

* * * * *